Dec. 31, 1935.  H. J. STEHLI  2,026,366
METHOD OF TREATING WET SEWAGE SLUDGE
Filed July 21, 1932  5 Sheets-Sheet 3
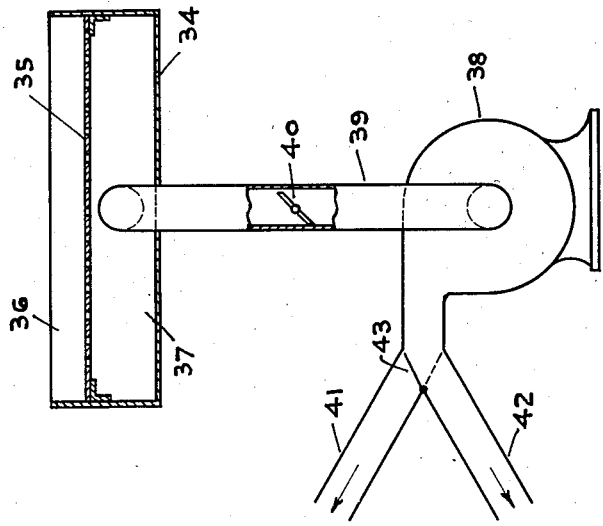
FIG. 3.
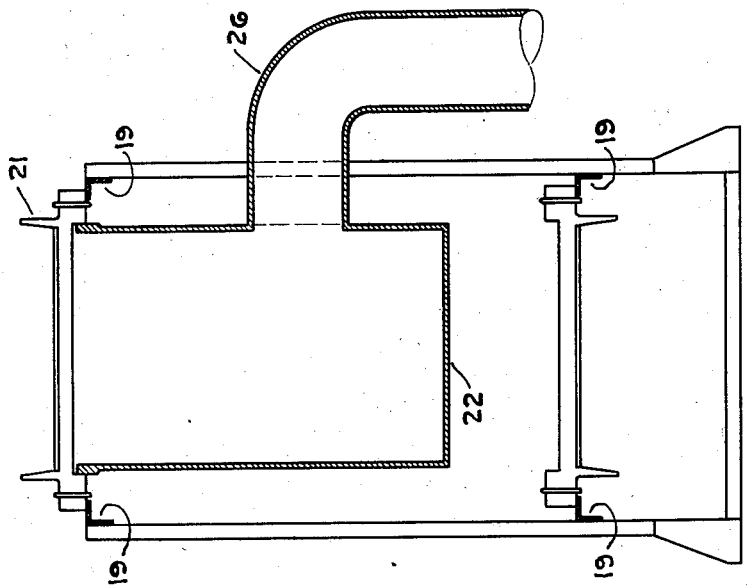
FIG. 2.A.
INVENTOR.
H. J. Stehli
BY T. F. Bourne
ATTORNEY Dec. 31, 1935. H. J. STEHLI 2,026,366
METHOD OF TREATING WET SEWAGE SLUDGE
Filed July 21, 1932 5 Sheets-Sheet 4
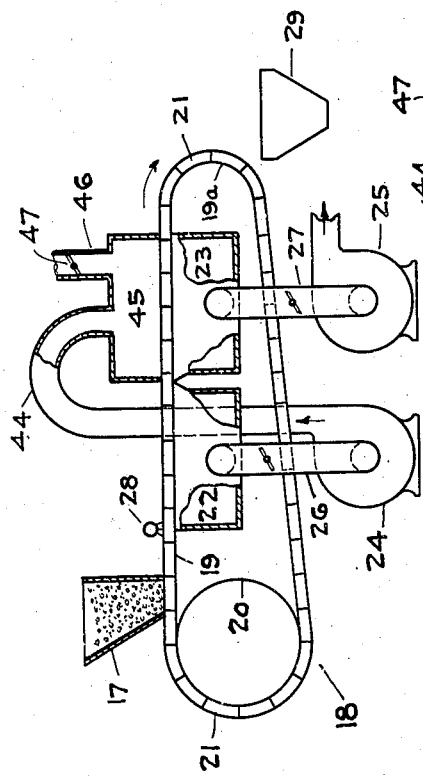
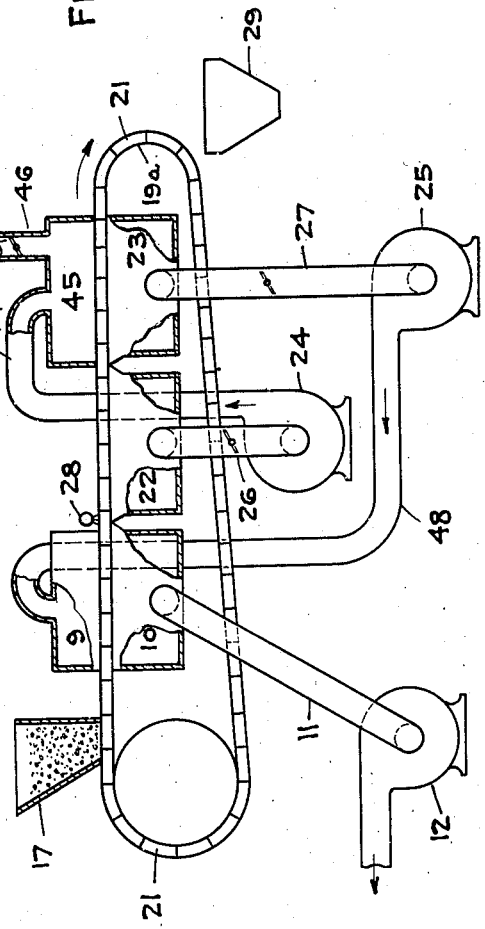
INVENTOR.
H. J. Stehli
BY T. F. Bourne
ATTORNEY

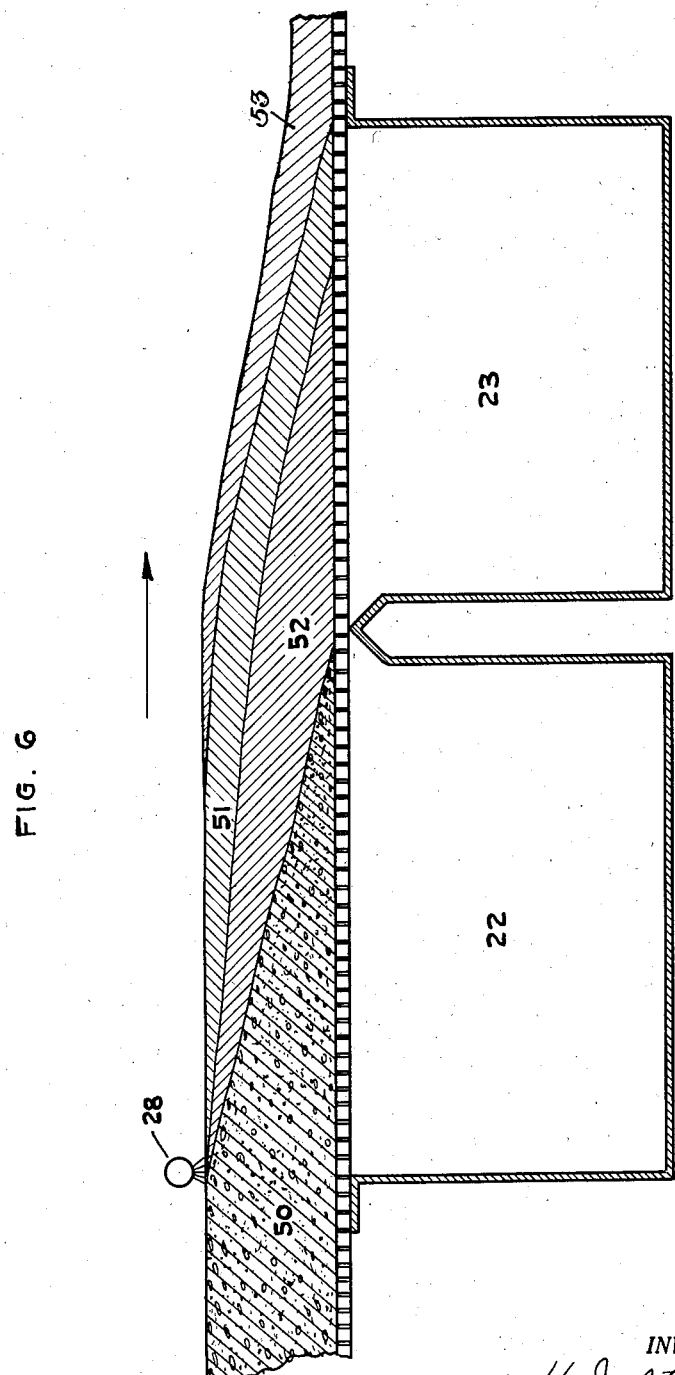

Patented Dec. 31, 1935

2,026,366

UNITED STATES PATENT OFFICE 2,026,366

METHOD OF TREATING WET SEWAGE SLUDGE

Henry J. Stehli, Cedar Grove, N. J.

Application July 21, 1932, Serial No. 623,831

12 Claims. (Cl. 110—15)

This invention relates to the disposal of waste organic material, and more particularly to the burning of material of this class in such a manner as to avoid turning into the atmosphere noxious or disagreeable odors.

Waste organic material, and more specially sewage sludge, which is the material resulting from the treatment of sewage by various methods whereby the solids are coagulated and precipitated and harmful bacteria are destroyed, present a serious disposal problem. Various methods of sewage treatment have been proposed, which are well known and need not here be further considered except to say that the end product is a mud of sludge containing the residual solid matter together with large proportions of water, the usual sludge, for example, containing approximately 80% moisture and 20% solids.

Attempts have been made to dry and burn this sludge, but the drying operation as heretofore carried out is a slow and expensive procedure, requiring prolonged application of natural or artificial heat and cumbersome apparatus; and while the dried material can be burned, a serious difficulty is met with in that noxious and evil smelling gases and dense smoke are produced in abundance, such that it is intensely disagreeable if not practically impossible to conduct such operations in inhabited districts. Consequently it has been necessary to build sludge incinerating plants in outlying districts with heavy expense for conveying the sludge to the incinerator and for other reasons.

The herein described invention provides a method for treating sewage sludge in such a manner that it may be burned without permitting noxious and disagreeable gases and odors to escape, and consequently it may be practiced in the most convenient location with respect to sewage collection, and without discommoding neighbors or damaging adjacent property.

In the accompanying flow sheet and drawings are shown in diagrammatic form various steps of the invention and typical forms of apparatus for carrying it out. These drawings are diagrammatic only, and are not intended to represent scale drawings of the apparatus, and it will be understood that various substitutions and alterations may be made without departing from the spirit of the invention.

Figure 1:
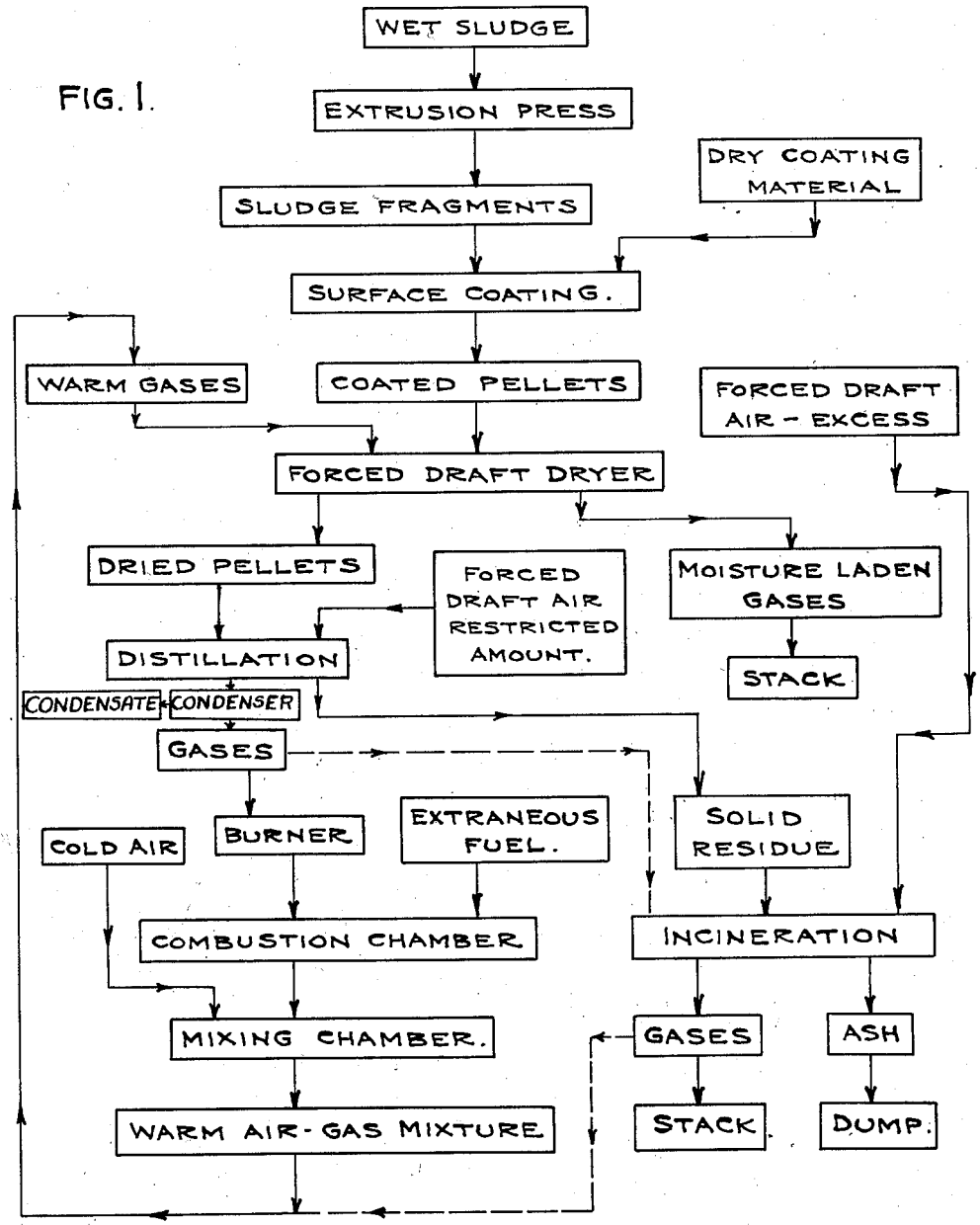
Fig. 1 represents a flow sheet of the preferred manner of conducting the operation.
Figure 2:
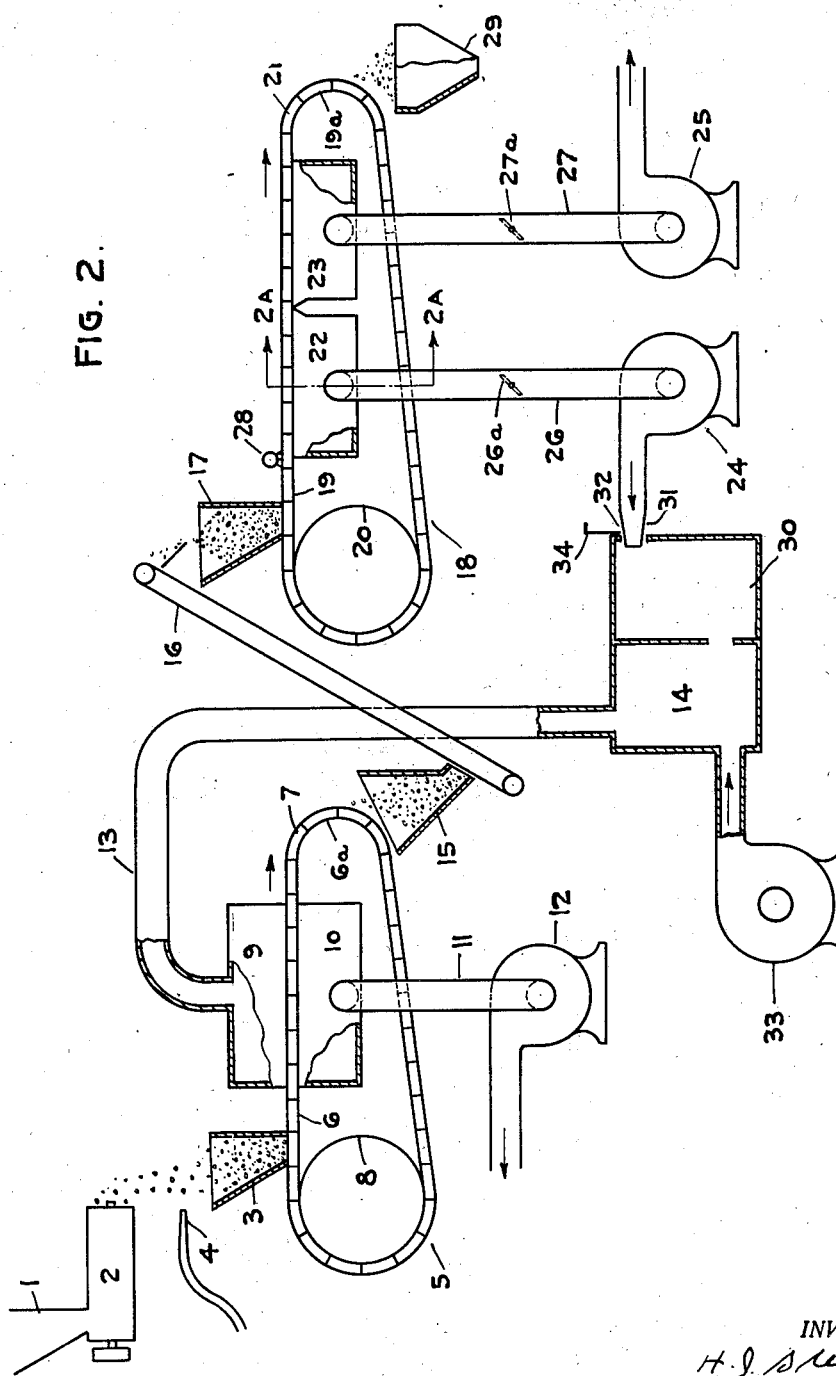
Fig. 2 is a diagrammatic elevation of apparatus suitable for practicing the invention.

Fig. 2ᵃ is a cross section on line 2ᵃ, 2ᵃ in Fig. 2.

Fig. 3 represents diagrammatically a form of apparatus for carrying out the distillation and burning operations.

Fig. 4 represents diagrammatically a modified form of apparatus for the same operations.

Fig. 5 shows a form of apparatus for carrying out the drying, distillation and burning steps.

Fig. 6 shows diagrammatically the various stages of the operation as they occur in a bed of the material treated in the apparatus of Fig. 2.

In treating sludge by the present invention, the material may first be dried to remove the large volume of water remaining therein after the settling or filtration customarily given.

It has been discovered that sewage sludge may be dried without decomposition of the solids if the operation is conducted at temperatures but little above the boiling point of water. For example, one particular sludge was dried at 225° F. with no obnoxious odor perceptible, while at 250° F, a distinct, disagreeable odor was given off.

The drying operation is preferably carried out by exposing the sludge, in the form of comparatively small fragments, to direct contact with gases heated to temperatures below the distillation point of odorous gases, the heated gases being forced into and through a shallow bed of the fragments to assure rapid and renewed contact and positive removal of moisture.

The sludge, which often has the appearance of thick mud, is first separated into small fragments or pellets by any desired means, such as an extrusion press, a shredder, a disintegrator, or other apparatus—depending on the character of the sludge. In order that the fragments may not again mass together, it may be desirable to partially dry their surfaces, which may be done by projecting a blast of warm gases against them as they leave the pelletizer, or the surfaces may be coated with fine dry material. Thus treated, the fragments or pellets retain their individual shape, overcoming the tendency to reunite in mass form which they otherwise might have.

The fragments or pellets may now be spread on a pervious support in an even layer sufficiently shallow to avoid unduly compressing the lower portion, in order that voids may be left between individual fragments or pellets for the free passage of gases. The smaller the fragments or pellets, the greater the surface area offered to drying gases. Thereupon, gases heated to a temperature near to but below the decomposition temperature of the solids, for example, heated to approximately 225° F., are forced rapidly through the layer, coming into intimate contact with the fragments or pellets and carrying away the contained moisture with great rapidity. The time required for this operation varies to some extent, depending on the original moisture content, the size of the fragments or pellets and to some extent on the character of the sludge. For example, a three inch layer of a certain sludge, pelletized to ¾ inch size, will dry from 80% moisture to bone dry in fifteen minutes with currents of gases heated to 225° F. passing through said sludge. Under the same conditions, but pelletized to ⅛ inch size, said sludge will dry in eight minutes. When properly prepared the sludge is dried in a few minutes only, as compared with the prolonged drying period required by other methods known to me.

The sludge is now ready for further treatment. It may be burned directly, but this results in the formation of objectionable gases and dense smoke, whereas the treatment hereinafter described avoids these objectionable by-products.

When the dried sludge is heated to temperatures of approximately 300° F. or higher under suitable conditions, it has been found, the sludge is decomposed with a rapid evolution of gases which, while noxious and of an intensely disagreeable odor, are combustible and may be utilized as a source of heat for the drying operation.

The dried sludge, in the form of small fragments, may now be charged onto a pervious support, such as the pellets of a "Dwight-Lloyd" sintering machine described and claimed in U. S. Patent No. 1,027,084 (1912), arranged so that air currents can be passed through the charge, and the gases from the operation can be drawn off for use and do not escape into the air. It is advantageous that a sufficiently thick layer of charge be used so that considerable resistance is offered to the passage of air through the bed of charge. For example, with dried fragments of ⅛" in size, a six inch thickness of charge and a draft of three inches water gauge will be satisfactory, while a deeper bed is advisable with larger fragments if the same draft is used.

The distillation is initiated by igniting the bed of charge at one surface and causing air in restricted amounts to pass into and through the bed. The combustion thus begun, for instance in the upper portion of the bed, produces heat which is carried into the middle and lower portions by the descending currents of gases (principally combustion products and inert gases—the oxygen originally contained in the air having been burned up)—and which heats the sludge fragments to a temperature sufficiently high to distill off the gaseous components and distillation products, while not furnishing sufficient oxygen to cause combustion. These products—mainly gaseous but with some condensable oily vapors—are collected. If desired, the oily components may be condensed and recovered separately, although they are combustible and may be burned with the gases. It will be apparent that only a limited amount of air should be admitted to the bed, as with excess air an explosive mixture might be formed with consequent possibility of damaging the apparatus. Regulation may be secured through suitable adjustment of the draft producing means (for example, by regulating the speed of a fan employed to move the gases, or by dampers or other well known means).

Distillation has been found to proceed at an appreciable rate at a temperature of approximately 300° F., and quite rapidly at higher temperatures, with certain sludges, although the temperature varies with different materials and is best determined by trial for any given material. If the oily distillation products are to be condensed and collected, it is preferable to conduct the operation so that the middle and lower portions of the bed are only moderately heated—say to about 300° F.—since at high temperatures the oils are broken down to gases, but if it is not desired to save these oils, higher temperatures may be used and the operation thereby be speeded up. The oily condensate may be used as fuel or as insecticide, etc., or may be purified for other uses.

The distillation products have a highly disagreeable odor, so that care should be taken to prevent leakage into the atmosphere. They may be stored in an ordinary gasometer, or preferably may be conducted directly to a furnace and there be burned much as ordinary gas is burned. Mixed with suitable proportion of air for combustion, they burn to the ordinary products of combustion, which are without objectionable odor. The gas may be used to ignite the upper surface of the bed in the distillation operation. It also may be used to supply the heat (or a portion thereof) required for the before described drying operation. Or it may be piped to any desired place for use.

In case the combustion of the distillation products does not furnish sufficient heat for the drying operation, the additional amount required may be supplied by burning any suitable fuel. The warm gases used for drying the sludge may be readily obtained by mixing these gaseous combustion products with volumes of cold air so regulated (as by thermostat control) as to supply a gas-air mixture heated to the desired temperature (for example, 225° F.).

The residue from the above described distillation is solid matter, largely combustible but usually with a small proportion of noncombustible matter. It may be burned in any desired type of incinerator or furnace. The preferred manner of disposing of it is to continue the combustion initiated in the distillation operation by forcing additional air in large volumes through the layer while on the same pervious support, provision being made, of course, to draw off the gaseous combustion products separately from the distillation products. With intermittent or bath type apparatus this may be done by diverting the gases coming from the bed of burning materials into a separate flue from that used for the distillation products—a valve being provided which can be operated at the close of the distillation period. With apparatus of the continuous type, as with the well known "Dwight-Lloyd" sintering machine, for example, the rate of travel of the charge-carrying perforate-bottom containers may be so adjusted that distillation proceeds and is completed at the end of one "windbox" or gas offtake chamber, provided with a fan which delivers the distillation products into a gasometer, while combustion of the residue is completed at a second "windbox" provided with another fan which delivers the combustion products to a stack. As the distillation products—the noxious and odoriferous products—have been removed separately, the combustion of the residue produces no disagreeable odors, and the combustion gases therefrom may be freely discharged into the atmosphere. The non-combustible matter from the original sludge remains behind as clean, harmless ash, and may be disposed of in any desired way.

As shown diagrammatically in the drawings, a plant for practicing the invention may consist of a hopper 1 (Fig. 2) for storing the wet sludge as received from the sewage sludge plant. From this hopper the sludge is fed into apparatus for breaking it up into small fragments. Such apparatus is typified by an extrusion press 2 from which the fragments drop into hopper 3 of the drying apparatus. Before reaching this hopper they may be surface-dried by a hot air blown from nozzle 4 or otherwise dry dust coated, if desired. The dryer is typified by the forced-draft dryer 5, comprising a suitable framework supporting a continuous track 6 around which perforate-bottom carriers 7 are caused to travel by sprocket wheels 8 driven by suitable known mechanism, not shown. The upper horizontal section of the track is enclosed in a drying chamber comprising upper and lower windboxes 9 and 10, so constructed as to fit closely to sides of the carriers to resist leakage of the drying gases. Lower windbox 10 is connected through piping 11 to fan 12 which exhausts the moisture laden gases from the windbox and may send them to a stack—not shown— from which they can escape to the atmosphere. Upper windbox 9 is connected by pipe 13 to heated-gas supply 14, to be described hereinafter.

Carriers 7, as they are propelled along the upper horizontal track, receive a charge of sludge fragments as the carriers pass under hopper 3, and carry the charge through the drying chamber in which heated gases are passed through the charge to evaporate and remove the moisture. The speed of the driving mechanism may be regulated by a well known speed regulator (not shown) so that each carrier remains in the drying chamber for a sufficient period to permit drying of its charge to the desired moisture content. The carrier then passes out of the chamber and around the track, discharging its load of dried sludge fragments as it passes around the curved portion 6ª of the track; the empty carriers returning by way of the lower track section to the sprocket wheels 8 which elevate them to the upper track section to repeat the cycle, in a well known way. The apparatus 6, 7, 8 may be analogous to the well known "Dwight-Lloyd" sintering machine.

From the dryer the dried sludge fragments are delivered to hopper 15 and are elevated by conveyor 16 to the feed hopper 17 of the distillation apparatus. This apparatus is typified by the distillation-combustion apparatus at 18, which may be somewhat like the dryer 5. The apparatus 18 comprises a framework supporting endless tracks 19 with sprockets 20, driven by suitable well known mechanism, (not shown), adapted to propel a train of perforate-bottom carriers 21 around the track. Beneath the upper horizontal section of track 19 are two suction boxes, 22 and 23, adapted to fit closely to the lower sides of carriers 21 and connected by piping to separate exhaust fans 24 and 25. In the connecting pipes 26 and 27 between the suction boxes and their respective fans are dampers or valves 26a and 27a for controlling the pressure and volume of gases moved by the fans.

As carriers 21 are propelled along the upper horizontal section of track 19, each carrier passes first under hopper 17 to be charged with dried sludge fragments. The charge is then moved at regulated rate of travel—determined by the speed of rotation of the sprocket wheels, which may be regulated by suitable adjustment of the prime mover, not shown—under an igniter 28 which may be perforated pipe from which issues burning gases, or any suitable ignition device, and which is located above the carriers at a point close to an edge of suction box 22. The heat from the igniter kindles the dried sludge at the upper surface of the charge, and combustion therein is promoted and maintained by air currents caused to pass downward through the charge into the windbox and be drawn out by exhaust fan 24. The volume of air is regulated, as by damper 26a, so that combustion is restricted to the upper portion of the bed of charge and is so limited that only sufficient heat is produced to raise the temperature of the dried sludge in the remainder of the bed to the point at which distillation of the sludge proceeds with the desired degree of rapidity. It will be understood that the heat generated by this combustion in the upper layer of the bed is carried downward and transferred to the lower portion by the descending currents of gaseous combustion products. By coordinating the rate of travel of the carriers with the rate of distillation of the sludge fragments as determined by the amount of heat and the rate of transfer throughout the charge, distillation of the noxious gases and vapors from the sludge is completed in the charge in each individual carrier as that carrier reaches a position at the end of suction box 22. The gaseous distillation products are withdrawn from suction box 22 by fan 24 and may be utilized as hereinafter described.

The residue remaining on the carrier comprises matter which may be burned without the production of disagreeable odors. As the carrier advances into the region above suction box 23, greatly increased volumes of air are drawn through the bed of solid distillation residue material remaining on the carrier, by suction fan 25, and the combustion previously initiated in the upper layer proceeds rapidly down through the entire bed, burning all the combustible matter and leaving a small residue of incombustible ash, which is discharged into a suitable receptacle, such as hopper 29, as the carrier travels down the track at 19a, from which hopper the residue may be removed at intervals and disposed of in any desired manner. The rate of combustion may preferably be regulated, as by control of the combustion air by valve 27a in the pipe 27 connecting suction box 23 with fan 25, so that all of the combustible residue is burnt by the time the carrier reaches the end of suction box 23. The gaseous combustion products issuing from fan 25 are largely carbon dioxide and nitrogen, and are similar in character to the gases from the combustion of wood or peat. They may, therefore, be sent to a chimney (not shown) or, if desired, may be utilized in a manner hereinafter described to make use of the sensible heat contained in them.

Now considering the gaseous distillation products obtained from suction box 22, as before stated these are noxious, and it is desirable that they should not be allowed to escape into the atmosphere. Moreover they are combustible, and capable of supplying appreciable amounts of heat. They may therefore be delivered from fan 24 into combustion chamber 30, of any suitable construction, as through nozzle 31, air for combustion being admitted through port 32, which may be regulated by any well known means, such as control damper 34. When said combustion products are mixed with the proper amount of air and burned, the noxious odors are destroyed, leaving harmless gaseous combustion products which may freely be emitted to the atmosphere. As indicated in Fig. 2, these heated gaseous combustion products may be admitted to mixing chamber 14 where cold air is mixed with them in the amount required to supply a gaseous mixture heated to the temperature desired for the drying operation in dryer 5. The cold air may be admitted by fan 33 which may be controlled, as by any well known thermostatic regulating device (not shown) to supply only the amount of cold air needed to bring the temperature of the air-combustion gas mixture to the desired point. This mixture then passes through pipe 13 to dryer 5 as before described.

In Fig. 3 is shown diagrammatically an intermittent or batch-operation apparatus in which the distillation and combustion operation may be carried out. It consists of holder 34, divided by perforate supports, such as grates 35, into an upper, sludge containing portion 36 and a lower suction box 37. Suction box 37 is connected to exhaust fan 38 by pipe 39 in which is placed valve or damper 40 for regulating the blast. Fan 38 delivers gases from box 37 to a pipe which is divided into leg 41, leading to gasometer, burner, or other gas holding or consuming device (not shown), and leg 42 leading to a stack (not shown) or to dryer 5, such as illustrated in Fig. 2. Valve 43 controls the admission of gases to either leg. In the operation of this device, the dried sludge fragments are charged onto the grates 35 of holder 34 in any desired manner, and leveled off to an approximately even layer. The top surface is then ignited by any desired means, and, fan 38 being in operation, air is drawn through the layer in restricted volumes, controlled by damper 40, to effect the distillation operation, much as described above. During this operation valve 43 is turned to divert the gaseous distillation products through leg 41 of the outlet pipe to a gasometer or otherwise as desired. When the endpoint of the distillation operation is reached, valve 43 is turned to divert the gases through leg 42 and damper 40 is opened to increase the volume of combustion air drawn through the bed of distillation residue. When the combustible matter is burned, the fan may be stopped, the ashes removed from the grates, and a new charge placed thereon to repeat the operation.

Fig. 4 illustrates a modification of the invention in which the gaseous distillation products may be rendered odorless in a variation of the above described procedure. The apparatus, as shown diagrammatically, is similar to the distillation-combustion apparatus of Fig. 2, so that the general features need not again be described. It differs, however, in that an additional windbox 45 is provided above suction box 23, and connected with fan 24 by pipe 44,—which box makes a close fit with the carriers 21. One or more ports 46, with dampers 47, are provided for admission of the necessary combustion air.

In operation, dried sludge fragments are charged onto carriers 21 from hopper 17, are carried under igniter 28 and the noxious gases are distilled therefrom, passing into suction box 22, and the solid residue is then burned in the region over suction box 23, as before described. In this modification of the invention, the noxious distillation products from suction box 22 are drawn and delivered by fan 24 through pipe 44 into the windbox 45 where air is admitted and mixed with them above the burning residue on the carriers 21 in this region to pass through the incandescent bed of burning material. As they pass through this incandescent bed, being mixed with sufficient fresh oxygen to support combustion, the gases are destroyed, burning to harmless and odorless combustion products which may be sent into the atmosphere freely. The hot products of combustion both of the distillation products and of the solid residue, which are drawn off by fan 25 may, therefore, be sent directly to the stack or may be utilized in the drying operation.

In Fig. 5 is shown diagrammatically a combined drying, distillation and combustion apparatus in which the complete treatment of the sludge fragments may be carried on. It comprises a series of perforate bottom carriers 21, propelled around a closed track (such as 6 or 19 of Fig. 2),—this portion of the apparatus with framework and drive mechanism not being shown. The carriers 21, being charged with wet sludge fragments from hopper 17 pass between the drying chamber windboxes 9, 10 where the fragments are dried as before described. The dried fragments are ignited at the top surface by igniter 28, and distillation proceeds in the region above suction box 22. Thereafter the residue is transported across the region between suction box 23 and windbox 45 where the residue is burned, and finally the ashes are discharged from the carriers which are returned to repeat the cycle.

Gaseous distillation products from suction box 22 pass by way of fan 24 and pipe 44 to windbox 45, where controlled amounts of combustion air are admitted through valved ports 46, and are passed through the incandescent bed of burning residue between boxes 23 and 45 where they are burned and all odor is destroyed. The resulting heated gaseous combustion products are withdrawn from suction box 23 by fan 25 and delivered by pipe 48 to the top windbox 9 of the drying section, where they are utilized to remove moisture from the wet sludge. It will, of course, be understood that the relative length of time required for the drying, distillation and combustion operations will vary to some degree with different materials, and that the corresponding sections of the apparatus should be proportioned thereto. However, a large degree of control of the time periods may be attained by regulation of the volumes of gases to and from the various sections, by temperature control, and so on, as hereinbefore described, so that a rigid proportioning of the apparatus itself is not essential.

Fig. 6 shows diagrammatically a cross section of the bed of material during the distillation and combustion operations. At the point where the charge on the carriers approaches the region above suction box 22 and under igniter 28, it is composed of dried sludge fragments 50. At igniter 28, the upper surface of the charge is ignited, and combustion therein proceeds to a limited degree, slowly progressing downward into the charge and forming a zone of combustion as typified by the hatched section 51, until the carrier reaches the end of suction box 22. During the same period, the heat thus produced is transferred to the lower portions of the bed, effecting distillation of the noxious gases and vapors which are drawn off into windbox 22, with the result that a zone of distilled solid residue, typified by section 52, is formed which extends down to the grates at the time the carrier reaches the end of windbox 22 and the beginning of windbox 23. Thus at this point the charge comprises a thin top layer or zone of burning material 51, with a lower zone 52 of distilled residue, while the zone 50 of undistilled sludge has disappeared.

As the carrier progresses across the region above suction box 23, where greater, volumes of air are passed through the charge, the combustible distillation residue 52 is progressively burned up, with the consequent decrease in thickness of zone 52 (distilled residue) until this zone disappears shortly before the end of suction box 23 is reached. The burning sludge residue (zone 51) disappears at the end of suction box 23, leaving only a thin layer of incombustible ash (zone 53) to be carried off and discharged from the grates.

This application is an improvement of copending application Serial No. 618,676 filed June 22, 1932 by Lloyd and Stehli. No claim is made herein to the process described in this said copending application except in combination with the step of distilling obnoxious gases during the drying process and prior to oxidizing the dried material.

What is claimed is:

1. The method of treating sewage sludge comprising separating the sludge into fragments, surface-coating the fragments with dry material to prevent their adhering to one another, drying the coated fragments and carrying away moisture laden gases therefrom, heating the upper portion of the dried fragments and passing heated gases therefrom through the lower portion of the fragments without burning the latter to distill noxious gases therefrom, burning the noxious gases, mixing gaseous products of combustion from said gases with air to a temperature below the distillation point of the sludge, and passing said mixture through fresh dry-coated sludge fragments to dry the latter.

2. The method of treating sewage sludge comprising separating the sludge into fragments, surface-coating the fragments with dry material to prevent their adhering to one another, drying the coated fragments and carrying away moisture laden gases therefrom, heating the upper portion of the dried fragments and passing heated gases therefrom through the lower portion of the fragments without burning the latter to distill noxious gases therefrom, causing the residue sludge to burn, and passing said noxious gases through residue sludge for simultaneously burning said gases and residue.

3. The method of treating sewage sludge comprising separating the sludge into fragments, surface-coating the fragments with dry material to prevent their adhering to one another, drying the coated fragments and carrying away moisture laden gases therefrom, placing the coated fragments in a thin layer, igniting the upper portion of the dried fragments and passing heated gases therefrom through the lower portion of the fragments without burning the latter to distill noxious gases therefrom, passing said noxious gases through burning residue sludge for simultaneously burning said gases and residue, and causing hot gaseous products of combustion from said lower portion to pass through additional coated fragments of sludge for drying said sludge.

4. The method of treating wet sewage sludge comprising separating the sludge into fragments, surface-drying the fragments to prevent their adhering to one another, spreading the fragments in a shallow layer, passing currents of moisture absorbent gases at a temperature below the distillation temperature of sludge components through said layer whereby the moisture is vaporized and removed with said gases, placing the dried fragments in a layer, igniting a surface portion of said layer, passing restricted volumes of combustion supporting gases through said layer to produce combustion in one portion of the strata without burning the entire strata, the heat from said combustion being transferred to the remaining strata thereby effecting distillation therein, removing the volatile distillation products, burning said volatile distillation products to supply hot combustion gases and diluting these hot combustion gases with sufficient cold air to reduce the temperature of the gases to a point below the distillation temperature of the sludge, utilizing said mixture of combustion products and cold air in the drying operation on other fragmented sludge, and passing greater volumes of combustion supporting gases through said remaining strata of sludge whereby its combustible matter is completely burned.

5. The method of treating sewage sludge comprising separating the sludge into fragments, surface-coating the fragments with dry material to prevent their adhering to one another, drying the coated fragments and carrying away moisture laden gases therefrom, heating the upper portion of the dried fragments and passing heated gases therefrom through the lower portion of the fragment without burning the latter to distill noxious gases therefrom, and burning the noxious gases.

6. The method of treating sewage sludges which comprises fragmenting said sludge, surface drying said fragments to prevent the fragments adhering to each other, heating said fragments to temperatures approximating but not in excess of about 225° F. to remove the moisture content of said fragments, heating said fragments to a temperature at least above that about 300° F. to distill obnoxious gases and substances therefrom without substantial oxidation thereof, and thereafter oxidizing the residues.

7. The method of treating sewage sludges which comprises fragmenting said sludge, coating the exterior surfaces of said fragments with dry powdered material to prevent said fragments from adhering together, forming a layer of said fragments, circulating air heated to temperatures approximating but not in excess of about 252° F. through said fragments to completely dry the same, then heating said fragments to temperatures at least approximately 300° F. to distill obnoxious gases and substances therefrom without substantial oxidation thereof, and thereafter oxidizing the residue.

8. In the method of claim 7, the added steps of collecting the gases evolved during the distillation heating, separating therefrom the condensible obnoxious substances and oxidizing the remaining obnoxious gases.

9. In the method of claim 7, the added step of igniting the surface of the layer of dried fragments and circulating downwardly through the said layer a restricted amount of air to limit the amount of combustion obtained in said fragments, the heat of combustion being at least sufficient to raise the temperature of the gases and the remaining fragments of the layer to temperatures at least approximating 300° F., and thereafter, when distillation of obnoxious gases and substances is complete, circulating downwardly an unrestricted amount of air to promote complete oxidation of the residue material on the said grate.

10. In the method of claim 6, the added steps of collecting and oxidizing the obnoxious gases and substances distilled from the said dried fragments and utilizing at least in part the sensible heat energy of the gaseous oxidation products thereof in the drying of other fragments.

11. In the method of claim 6, the added steps of collecting and oxidizing the obnoxious gases and substances distilled from the said dried fragments and admixing said gases with the air utilized to oxidize the said residues.

12. In the method of claim 6, the added steps of collecting and oxidizing the obnoxious gases and substances distilled from the said dried fragments and admixing said gases with the air utilized to oxidize the said residues, and utilizing at least in part the sensible heat of the gaseous oxidation products of said residues in the drying of other fragments.

HENRY J. STEHLI.